United States Patent
Kubota

(10) Patent No.: US 7,283,261 B2
(45) Date of Patent: Oct. 16, 2007

(54) IMAGE PROCESSING METHOD, MANIPULATION DETECTION METHOD, IMAGE PROCESSING DEVICE, MANIPULATION DETECTION DEVICE, IMAGE PROCESSING PROGRAM, MANIPULATION DETECTION PROGRAM, AND IMAGE FORMATION MEDIUM

(75) Inventor: Masako Kubota, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1002 days.

(21) Appl. No.: 10/351,510

(22) Filed: Jan. 27, 2003

(65) Prior Publication Data

US 2004/0057081 A1   Mar. 25, 2004

(30) Foreign Application Priority Data

Sep. 20, 2002   (JP) .............................. 2002-275717

(51) Int. Cl.
*G06K 15/00*   (2006.01)
*H04N 1/40*   (2006.01)

(52) U.S. Cl. .................... 358/1.14; 358/1.18; 358/3.28
(58) Field of Classification Search ............... 358/1.15, 358/1.13, 1.14, 1.1, 2.1, 3.02, 3.1, 3.28, 1.18
See application file for complete search history.

(56) References Cited

U.S. PATENT DOCUMENTS 5,487,567 A * 1/1996 Volpe .......................... 283/72
6,571,334 B1 * 5/2003 Feldbau et al. ............. 713/170
2001/0021251 A1 * 9/2001 Kasai .......................... 380/201
2003/0005304 A1 * 1/2003 Lawandy et al. ............ 713/176

FOREIGN PATENT DOCUMENTS

| JP | A 6-176036 | 6/1994 |
|---|---|---|
| JP | A 6-258982 | 9/1994 |
| JP | A 7-231384 | 8/1995 |
| JP | A 2000-138813 | 5/2000 |
| JP | A 2000-165640 | 6/2000 |
| JP | A 2001-24877 | 1/2001 |
| JP | A 2001-197297 | 7/2001 |
| JP | A 2001-324898 | 11/2001 |
| JP | A 2001-346032 | 12/2001 |

* cited by examiner

Primary Examiner—Douglas Q. Tran
(74) Attorney, Agent, or Firm—Oliff & Berridge, PLC

(57) ABSTRACT

An image processing method for detecting alteration of data formed on an image formation medium on which a main data image and a copy detection latent image are formed. The method comprises a first image creation step of creating an image in a state identical to a state of an image which is obtained by scanning the image formation medium on which the main data image and the copy detection latent image are formed, a one-way value operation step of effecting a one-way value operation on the image created at the first image creation step to calculate a one-way value, an image conversion step of converting the one-way value into an image representing the one-way value, a second image creation step of creating an image by superimposing the image representing the one-way value, the main data image and the copy detection latent image.

11 Claims, 15 Drawing Sheets

IMAGE PROCESSING METHOD, MANIPULATION DETECTION METHOD, IMAGE PROCESSING DEVICE, MANIPULATION DETECTION DEVICE, IMAGE PROCESSING PROGRAM, MANIPULATION DETECTION PROGRAM, AND IMAGE FORMATION MEDIUM

BACKGROUND OF THE INVENTION

1. Field of the Invention

The present invention relates to an image processing method, a manipulation detection method, an image processing device, a manipulation detection device, an image processing program, and a manipulation detection program, all for use with an image formation medium and for detecting alteration, manipulation or interpolation of data on the image formation medium on which a latent image is formed. The present invention further relates to an image formation medium.

2. Description of the Related Art

A known method for verifying that a document has not been altered makes use of digital signatures.

Japanese Patent Laid-open Publication No. Hei 6-176036 discloses a method for creating a digital signature indicative of data and the sender of the data and for forming on an image formation medium for distribution an image in which the digital signature is embedded. A digital signature can be created through an operation using a hash function based on the main data for distribution and data on the sender. For determination as to whether or not the data has been altered, a digital signature is decoded for authentication. Besides the above-mentioned application, see Japanese Patent Laid-open Publication No. 2000-138813, Japanese Patent Laid-open Publication No. 2001-024877, and Japanese Patent Laid-open Publication No. 2000-165640, for example.)

Meanwhile, technology is known to prevent an image on an image formation medium from being copied using a copying machine. According to this technology, a latent image which becomes visible and/or clearly recognizable in the form of text or the like when the image is copied (hereinafter referred to simply as a latent image) is embedded in an image on an image formation medium. In addition, an image processing method is disclosed in which forgery prevention image information is added to data defining an image for which prohibition of copying is desired, when the image is formed on an image formation medium. The forgery prevention image data simplifies tracing of a route via which information on the image formation medium has been distributed. (See Japanese Patent Laid-open Publication No. 2001-346032, Japanese Patent Laid-open Publication No. 2001-197297, and Japanese Patent Laid-open Publication No. 2001-324898, Japanese Patent Laid-open Publication No. Hei 6-258982, and Japanese Patent Laid-open Publication No. Hei 7-231384.)

According to the above art, a latent image which becomes visible or clearly recognizable to the human eye upon copying distribution information is formed along with an image indicating the distribution data on an image formation medium. When the medium with such images is illegally copied, the latent image becomes visible or clearly recognizable such that it appears on image of the distribution information on an image formation medium of the copied version. This makes it easier to determine whether or not the image has been copied.

The above-described art which uses an image formation medium having an embedded latent image, however, has a problem such that, because a hash function operation is applied to the entire image formed on an image formation medium, which contains the latent image shown in a visible and/or clearly recognizable state as rendered during reading of the image data, whether or not the main data has been interpolated or manipulated cannot be determined.

SUMMARY OF THE INVENTION

According to one aspect of the present invention, there is provided an image processing method for detecting alteration of data on an image formation medium on which a main data image and a copy detection latent image which becomes visible and/or more clearly distinguishable are formed, the method comprising a first image creation step of creating an image in a state identical to a state of an image which is obtained by scanning the image formation medium; a one-way value operation step of effecting one-way value operation on the image created at the first image creation step to calculate a one-way value; an image conversion step of converting the one-way value into an image representing the one-way value; a second image creation step of creating an image by superimposing the image representing the one-way value, the main data image, and the copy detection latent image.

According to another aspect of the present invention, there is provided a manipulation detection method for scanning an image formation medium on which an image which is a superimposition of an image representing a first one-way value, a main data image, and a copy detection latent image is formed, to detect alteration of data on the image formation medium, the image representing the first one-way value being obtained through operation based on an image in a state identical to a state of an image which is obtained by scanning an image formation medium on which the main data image and the copy detection latent image are formed, the method comprising an image scanning step of scanning the image formed on an image formation medium; a one-way value operation step of effecting a one-way value operation on the image excluding the image representing the first one-way value from the image scanned at the image scanning step; a first one-way value specifying step of specifying the first one-way value based on the image representing the first one-way value which is scanned at the image scanning step; a manipulation detection step of detecting alteration of the data on the image formation medium through comparison between the first one-way value specified at the first one-way value specifying step and the second one-way value calculated at the one-way value operation step.

According to still another aspect of the present invention, there is provided an image processing device for detecting alteration of data on an image formation medium on which a main data image and a copy detection latent image which becomes visible or more clearly distinguishable are formed, the device comprising first image creation means for creating an image in a state identical to a state of an image which is obtained by scanning the image formation medium; one-way value operation means for effecting a one-way value operation on the image created by the first image creation means to calculate a one-way value; image conversion means for converting the one-way value into an image representing the one-way value; second image creation means for creating an image by superimposing the image representing the one-way value, the main data image, and the copy detection latent image.

According to yet another aspect of the present invention, there is provided a manipulation detection device for scanning an image formation medium on which an image which is a superimposition of an image representing a first one-way value, a main data image, and a copy detection latent image is formed, to detect alteration of data on the image formation medium, the image representing the first one-way value being obtained through operation based on an image in a state identical to a state of an image which is obtained by scanning an image formation medium on which the main data image and the copy detection latent image are formed, the device comprising image scanning means for scanning the image formed on an image formation medium; one-way value operation means for effecting a one-way value operation on the image excluding the image representing the first one-way value from the image scanned by the image scanning means; first one-way value specifying means for specifying the first one-way value based on the image representing the first one-way value which is scanned by the image scanning means; manipulation detection means for detecting alteration of the data on the image formation medium through comparison between the first one-way value specified by the first one-way value specifying means and the second one-way value calculated by the one-way value operation means.

According to yet another aspect of the present invention, there is provided an image processing program product for detecting alteration of data on an image formation medium on which a main data image and a copy detection latent image which becomes visible and/or more clearly distinguishable are formed, the product having a computer to perform a first image creation step of creating an image in a state identical to a state of an image which is obtained by scanning the image formation medium; a one-way value operation step of effecting one-way value operation on the image created at the first image creation step to calculate a one-way value; an image conversion step of converting the one-way value into an image representing the one-way value; a second image creation step of creating an image by superimposing the image representing the one-way value, the main data image, and the copy detection latent image.

According to yet another aspect of the present invention, there is provided a manipulation detection program product for scanning an image formation medium on which is formed an image which is a superimposition of an image representing a first one-way value, a main data image, and a copy detection latent image, to detect alteration of data on the image formation medium, the image representing the first one-way value being obtained through operation based on an image in a state identical to a state of an image which is obtained by scanning an image formation medium on which the main data image and the copy detection latent image are formed, the product having a computer to perform an image scanning step of scanning the image formed on an image formation medium; a one-way value operation step of effecting one-way value operation on the image excluding the image representing the first one-way value from the image scanned at the image scanning step; a first one-way value specifying step of specifying the first one-way value based on the image representing the first one-way value which is scanned at the image scanning step; a manipulation detection step of detecting alteration of the data on the image formation medium through comparison between the first one-way value specified at the first one-way value specifying step and the second one-way value calculated at the one-way value operation step.

According to yet another aspect of the present invention, there is provided an image formation medium on which an image which is a superimposition of an image representing a first one-way value, a main data image, and a copy detection latent image is formed, in which the image representing the first one-way value is obtained through operation based on an image in a state identical to a state of an image which is obtained by scanning an image formation medium on which the main data image and the copy detection latent image are formed.

As described above, the present invention can detect whether or not data of an image containing a latent image formed on an image formation medium latent image has been manipulated.

DESCRIPTION OF THE PREFERRED EMBODIMENT

Device Structure

Figure 1:
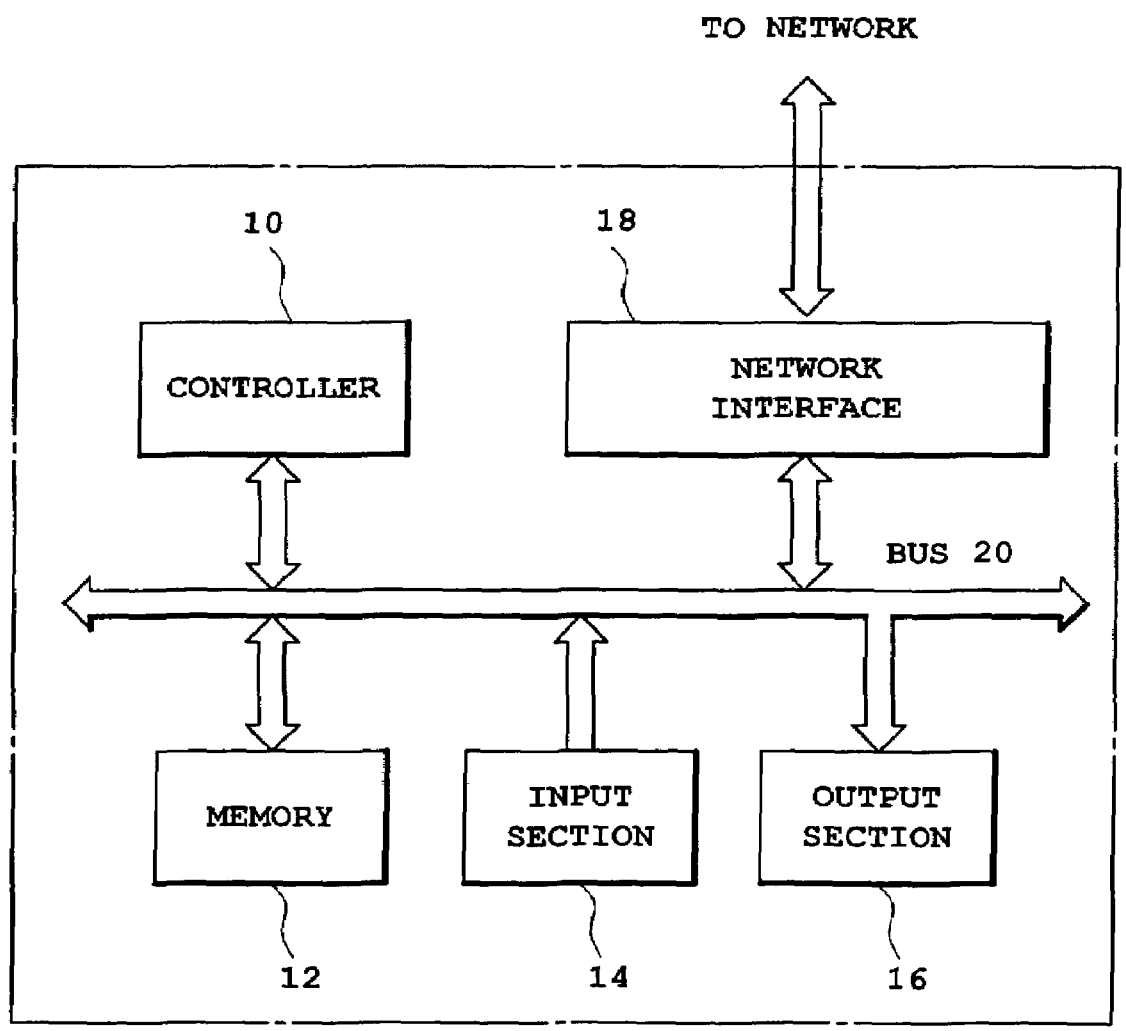
FIG. 1 is a block diagram showing a structure of an image processing device and a manipulation detection device according to an embodiment of the present invention.

An image processing device and a manipulation detection device according to a preferred embodiment of the present invention comprise a controller 10, a memory 12, an input section 14, an output section 16, and a network interface 18, as shown in FIG. 1. The controller 10, the memory 12, the input section 14, the output section 16, and the network interface 18 are interconnected via a bus 20 for data exchanging.

Figure 2:
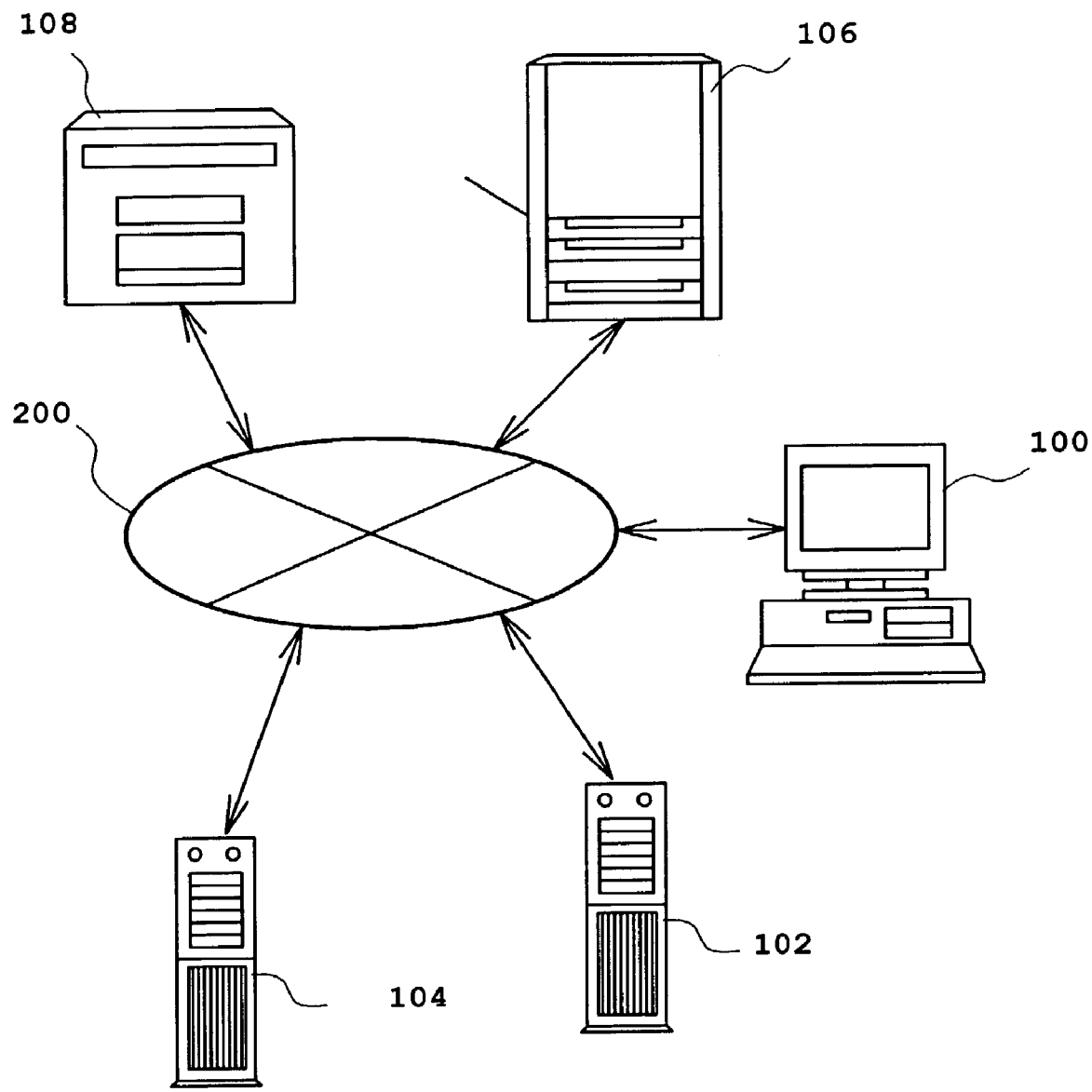
FIG. 2 is a block diagram showing a structure in which an image processing device and a manipulation detection device are connected to a network.

As shown in FIG. 2, the image processing device and the manipulation detection device are mutually connectable via a network 200 for data exchanging. The image processing device and the manipulation detection device may be any of a client computer 100, a print server 102, a scanner server 104, a printer 106, and a scanner 108. A client computer may incorporate functions of the print server 102 and the scanner server 104. The image processing device and the manipulation detection device may be either a single device or separate devices.

The controller 10 executes an image processing program or an image reading program which is stored in the memory 12, receives data for storage in the memory 12 and other data via the input section 14, and displays, on the output section 16, a result of processing according to the image processing program and the image reading program, as well as an interface screen image. The controller 10 stores processed data and the like in the memory 12 or, temporarily, in the controller's own cache memory.

The memory 12 stores an image processing program, an image reading program, data input, a print image, and so forth. The memory 12 is referred to by the controller 10 during execution of a program. The memory 12 may comprise a semiconductor memory, and may preferably comprise a large-scale memory device, such as a hard disk, an optical disk, a magneto-optical disk, a magnetic disk, or a magnetic tape, so as to store image data such as a print image.

The input section 14 receives information required in program execution. A user can input data, such as a user name and a password, which is necessary for the processing via the input section 14. As an input section 14, a text input device, such as a keyboard, and a pointing device, such as a mouse, may be selectively used as desired. An image formed on an image formation medium may be scanned using an image reading device, such as a copier, a scanner, and so forth.

The output section 16 displays a print image as a screen image for confirmation, an input interface screen image, and so forth. A user can confirm a result of processing via the output section 16. As an output section 16, display devices such as a printer and a display may be selectively used as desired.

Copy Detection Latent Image

Figure 3:
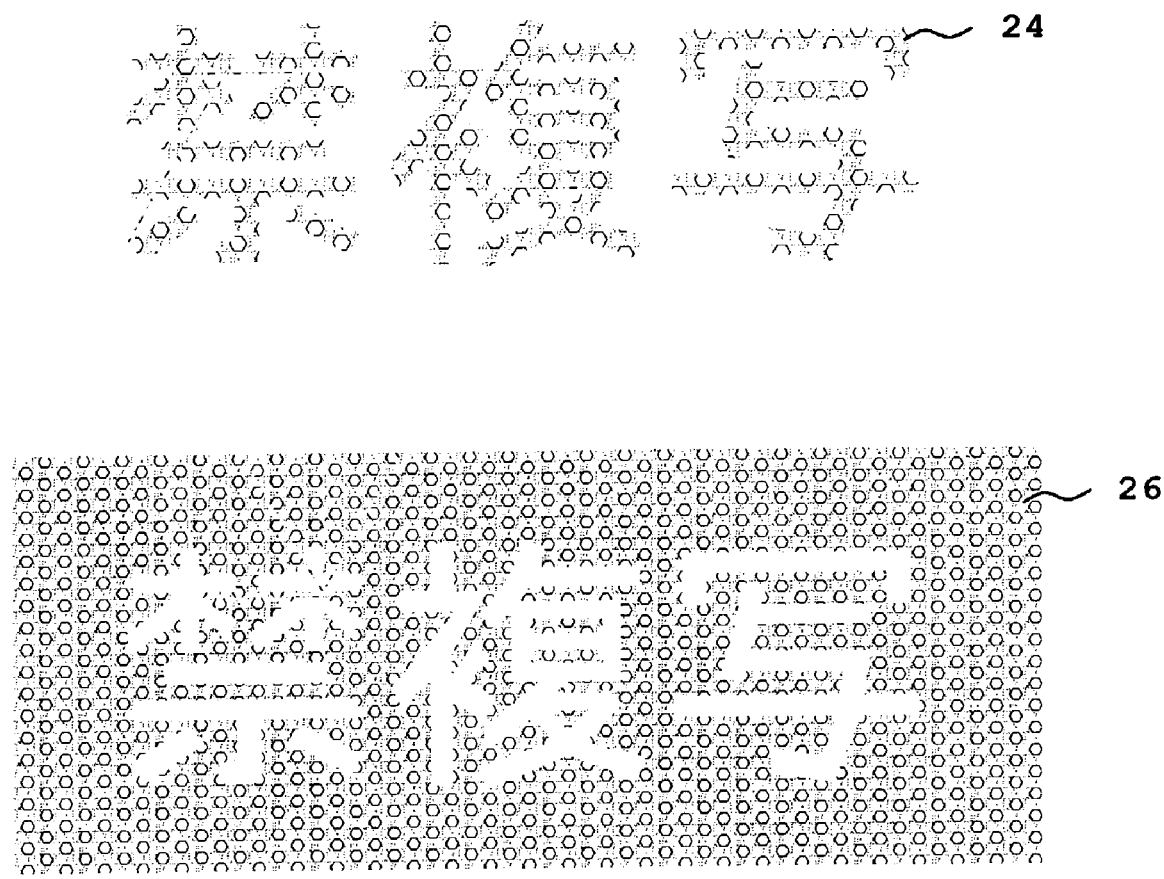
FIG. 3 is a diagram showing a copy detection latent image.

A copy detection latent image will be described with reference to FIG. 3.

A copy detection latent image comprises a disappearing pattern 26 and a remaining pattern 24. A disappearing pattern 26 cannot be copied using a copying machine and thus does not remain in copied images. A remaining pattern 24, on the other hand, can be copied using a copying machine and thus remains in the form of an image after being copied.

Because a remaining pattern 24 is composed of dots larger than those which are readable for image scanning resolution of a copying machine, the pattern constituting dots can be read by a copying machine or an mage scanning machine when it scans the remaining pattern 24, so that the pattern is reproduced.

A disappearing pattern 26, on the other hand, is composed of dots smaller than those which are readable for image scanning resolution of a copying machine, the pattern constituting dots cannot be scanned by a copying machine or an image scanning machine when it scans the disappearing pattern, so that the pattern is not reproduced.

Figure 4:
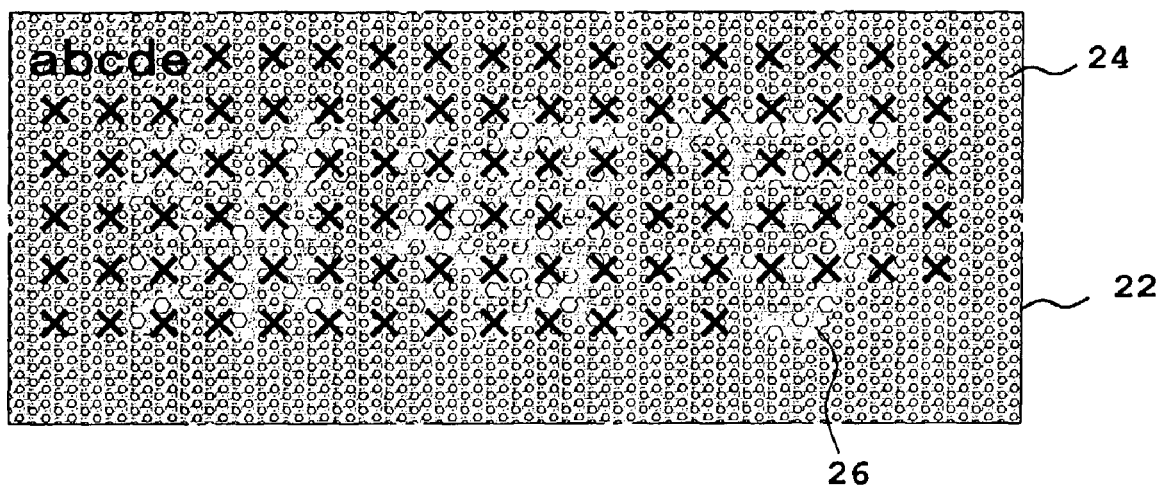
FIG. 4 is a diagram showing a copy detection latent image in which a remaining pattern is embedded in a disappearing pattern.
Figure 5:
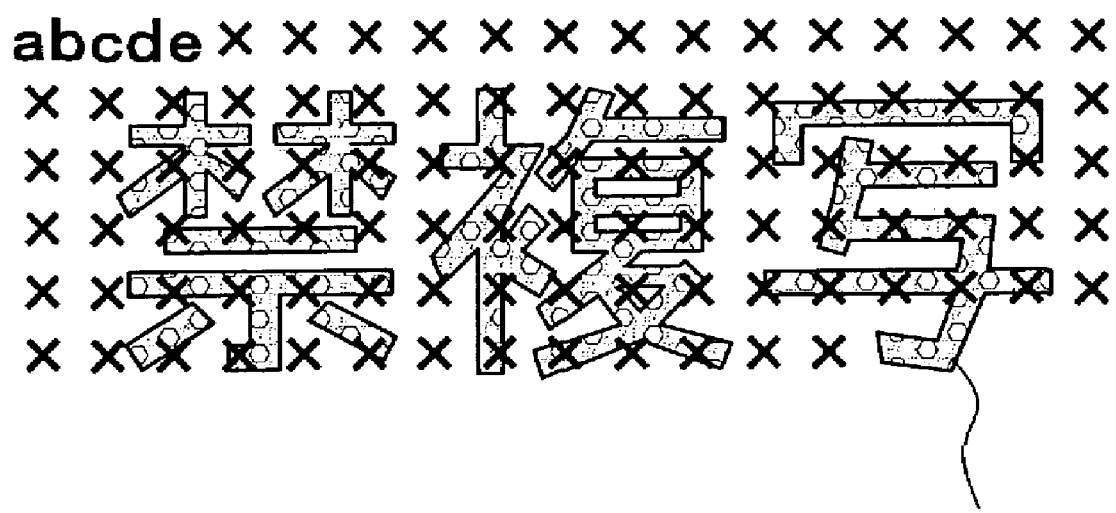
FIG. 5 is a diagram showing a remaining pattern in a visible state as a result of copying.

As shown in FIG. 4, a remaining pattern 24 is embedded in a disappearing pattern 26 to thereby form a latent image 22 for image formation on an image formation medium. When the latent image is copied using a copying machine, the remaining pattern 24 remains and appears on a medium on which a copied image has been formed in a visible or clearly recognizable state. That is, an image formation medium on which a remaining pattern 24 is clearly shown, as shown in FIG. 5, can be found as a machine-copied version.

In the following, for clarification, a remaining pattern 24 in an invisible and/or not recognizable state before being copied is represented by a pattern without a border, while a remaining pattern 24 in a visible and/or clearly recognizable state after being copied is represented by a pattern with a border.

Image Processing Method and Manipulation Detection Method

Figure 6:
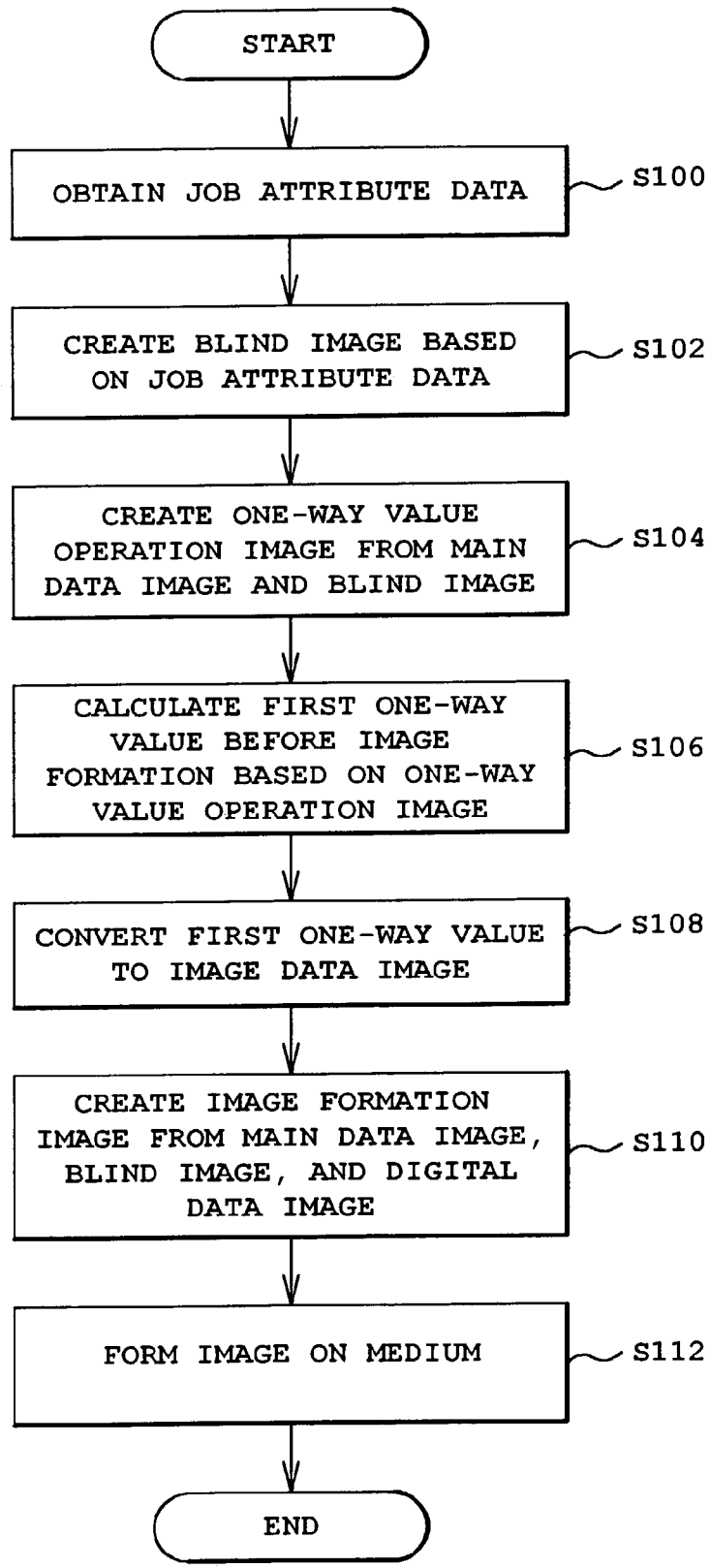
FIG. 6 is a flowchart of an image processing method in the embodiment according to the present invention.
Figure 7:
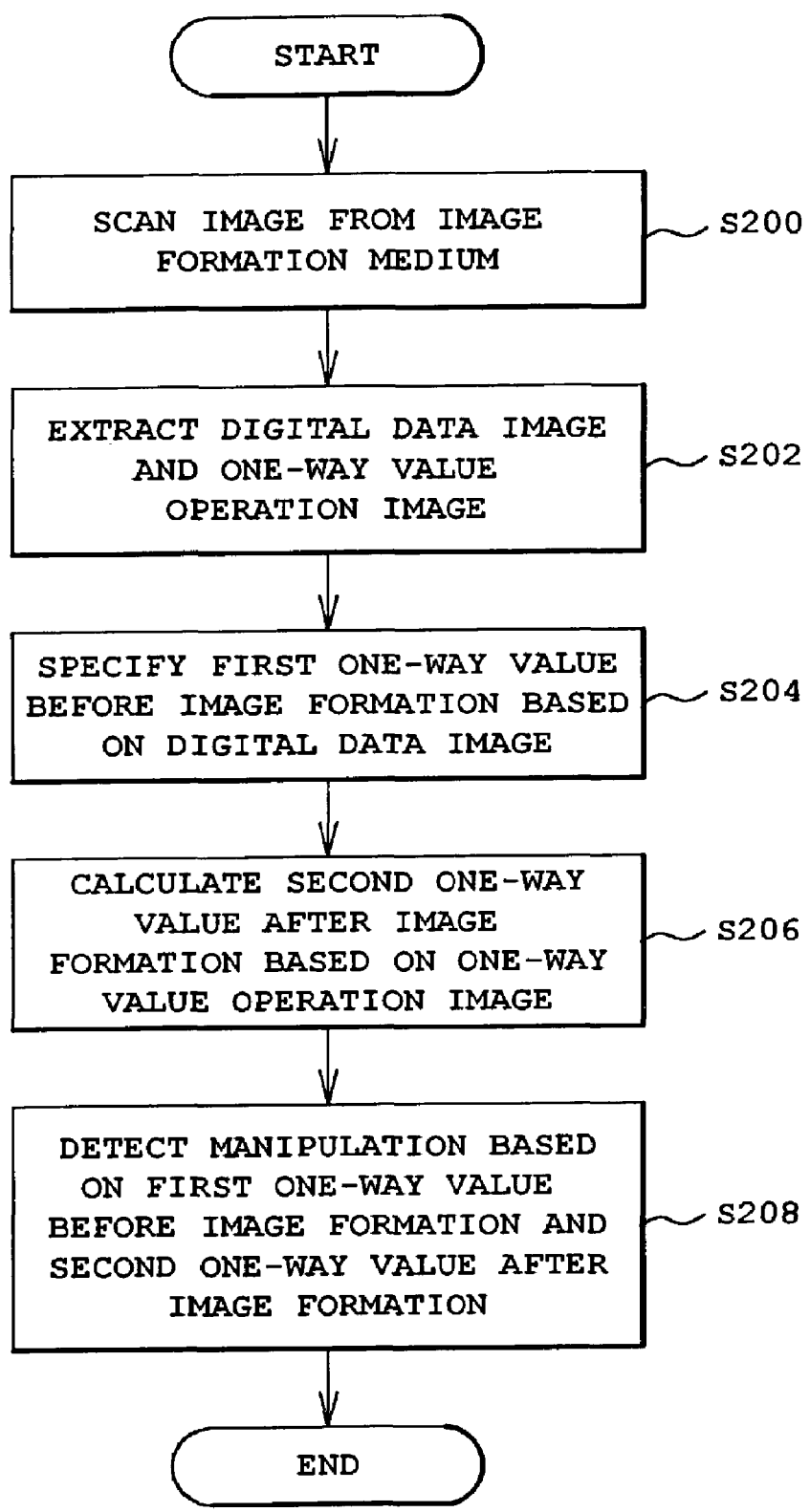
FIG. 7 is a flowchart of a manipulation detection method in the embodiment according to the present invention.

This embodiment is carried out following the flowcharts of FIGS. 6 and 7. This embodiment basically comprises an image processing method and a manipulation detection method. In the following, these methods will be described separately.

1. Image Processing Method

Figure 8:
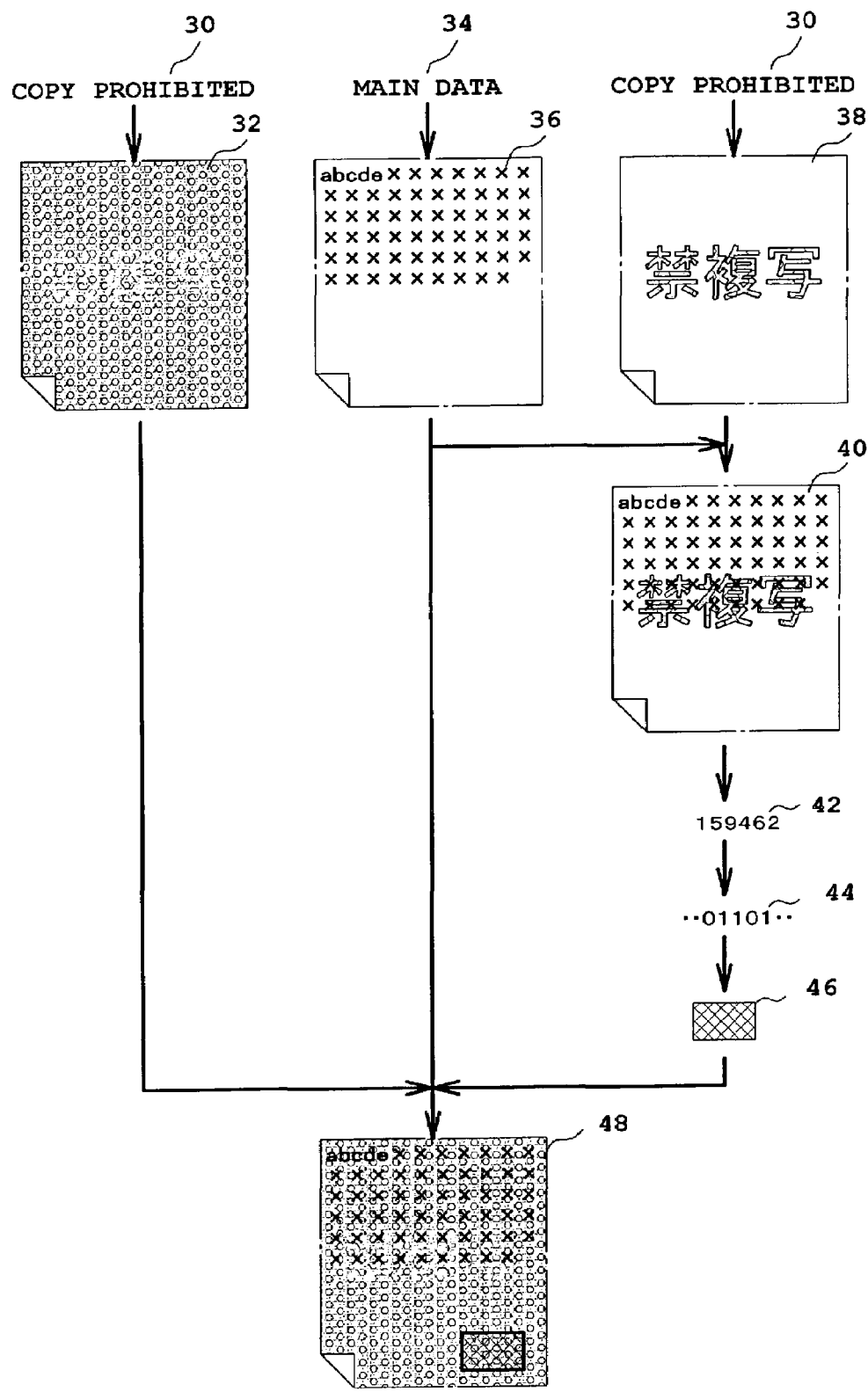
FIG. 8 is a diagram explaining processing according to an image processing method in the embodiment of the present invention.

An image processing method in this embodiment will be described in detail with reference to FIGS. 6 and 8.

An image processing method is stored in the form of a computer executable program in the memory 12, and read out from the memory 12 by the controller 10 for execution. The memory 12 may also store the main data 34 to be inserted into an image for image formation on an image formation medium.

At step S100, the controller 10 obtains job attribute data 30 for use in image formation. Job attribute data 30 is unique to each instance of image formation, and typically includes information such as a label or identification of the main data 34 to be processed, the name or identifier of a user performing the processing, identifying information of the image processing device used, date of image formation, location information, and so forth.

In the example of this embodiment, the job attribute data comprises a label that reads "copy prohibited" in Japanese, which indicates that copying of the main data 34 is prohibited.

At S102, the controller 10 creates a copy detection latent image 32 based on the job attribute data 30 according to conventional latent image creation procedures.

At S104, the image of main data and the copy detection latent image are combined to thereby create a one-way value operation image 40.

Specifically, the controller 10 retrieves the main data 34 from the memory 12, and converts it into an image for formation on an image formation medium, as a main data image 36. The conversion may be conducted according to conventional image creation. The controller 10 further creates an image corresponding to the image of the copy detection latent image 32 in a visible and/or clearly recognizable state, as a visible latent image 38, i.e., an image which the copy detection latent image 32 becomes or is revealed to be after it is copied.

Subsequently, the controller 10 combines the main data image 36 and the visible latent image 38 to thereby create a one-way value operation image 40. Therefore, a resultant one-way value operation image 40 resembles an image which will be obtained by copying, using a copying machine or an image scanning machine, the main data image 36 combined with the copy detection latent image 32.

At step S106, the controller 10 performs a one-way value operation with respect to the one-way value operation image 40 to thereby calculate a one-way value 42.

The one-way value operation may employ, but is not limited to processes employing, a hash function, such as SHA-1 (Secure Hash Algorithm 1), MD5 (Message Digest 5), or the like. Alternatively, the one-way value operation may use any other function for calculating a one-way value based on original data such that the original data is not reproducible based on the calculated one-way value.

At step S108, the controller 10 converts the first one-way value 42 into digital data 44 using conventional digitalizing. The digital data 44 is converted into a digital data image 46 which incorporates the digital data 33. The digital data image 46 may preferably be a bar code, for example, or any combination of numbers or symbols recognizable to the human eye.

At step S110, the controller 10 combines the main data image 36, the copy detection latent image 32, and the digital data image 46 to thereby create an image for formation (printing), as a draft image 48. As a result of combination, a draft image 48 in which the digital data image 46 will be located at a predetermined position on an image formation medium is preferably created.

At S112, the controller 10 sends the draft image 48 to the output section 16 for image formation on an image formation medium. The output section 16 may be a printer or the like which forms an image on an image formation medium, such as paper.

2. Manipulation Detection Method

Figure 9:
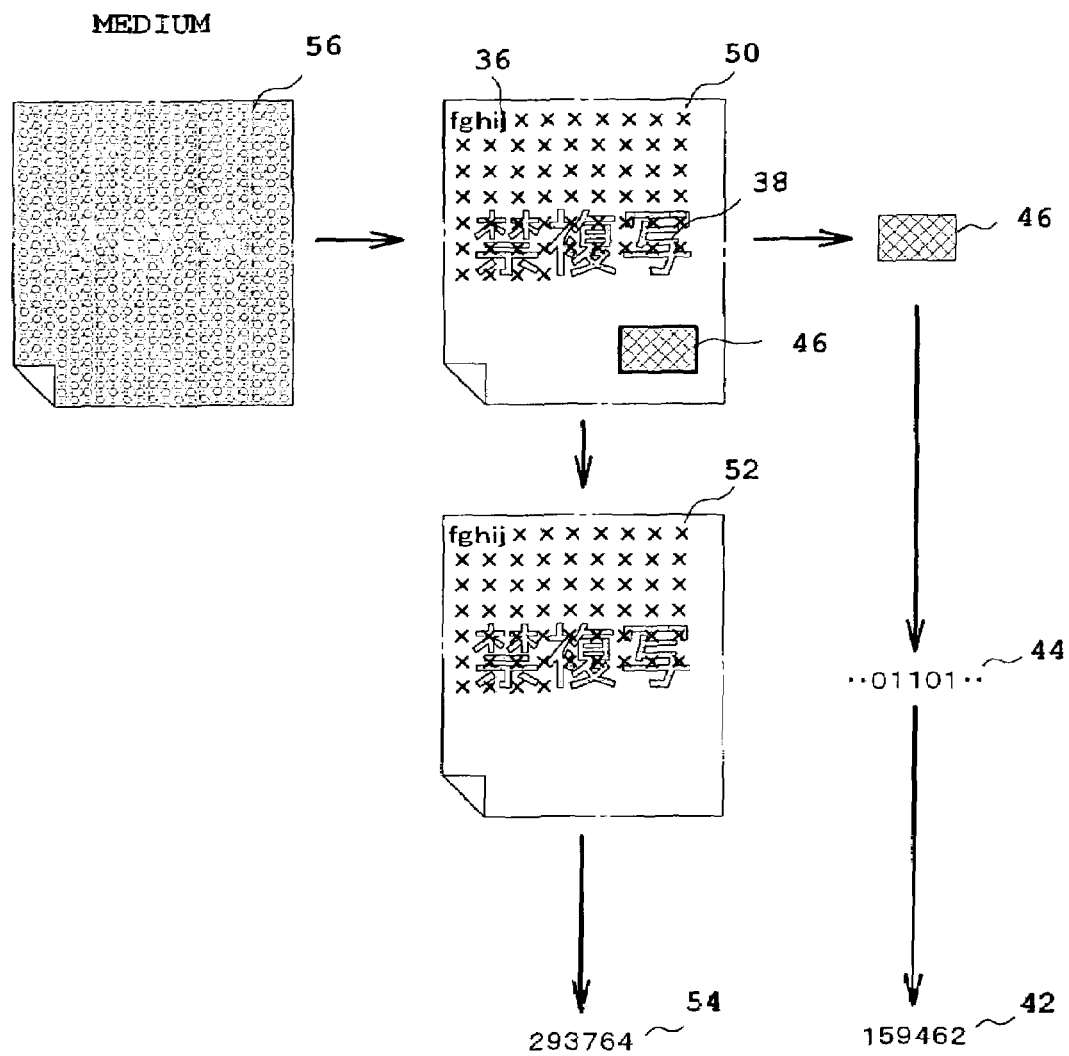
FIG. 9 is a diagram explaining processing according to a manipulation detection method in the embodiment of the present invention.

An example manipulation detection method according to this embodiment will be described in detail with reference to FIGS. 7 and 9. A computer executable program for the manipulation detection method is stored in the memory 12, and the controller 10 reads it out from the memory 12 for execution.

At step S200, an image formed on an image formation medium, or an image formation medium image 56, is scanned using an image scanning machine, such as a copying machine and a scanner, and supplied to the controller 10.

During the scanning, the disappearing pattern within the copy detection latent image 32 disappears, remaining just the remaining pattern. As a result, the image formation medium image 56 on which an image comprising the copy detection latent image 32 is embedded is scanned as superimposition of the main data image 36, the visible latent image 38, and the digital data image 46, resulting in an image 50.

At step S202, the controller 10 specifies and removes the digital data image 46 which is embedded in a predetermined position in the image 50. As a result, a one-way value operation image 52 in which the main data image 36 and the visible latent image 38 are superimposed is obtained.

At step S204, the controller 10 converts the digital data image 46 back into a digital data 44, and further to the first one-way value 42 before image formation using an inverse function of the function which is used in conversion from the first one-way value 42 to the digital data 44, according to the above-described image processing method.

At step S206, the controller 10 applies one-way value operation to the one-way value operation image 52 to obtain a second one-way value 54 after image formation(scanning).

For one-way value operation, a one-way function such as a hash function may be used, similar to the above-mentioned image processing method.

At S208, the controller 10 compares the first one-way value 42 before image formation and the second one-way value 54 after image formation, and determines that the main data 34 has not been altered when these values are equal, or, when the values are not equal, determines that the main data 34 has been altered. It is preferable for the controller 10 to display, on the output section 16, a screen image indicating that the main data 34 has been interpolated/manipulated.

Because a copying machine having very high scanning resolution may read also the disappearing pattern 26, when such a machine is used, the scanned image 50 may not be recognized as superimposition of the main data image 36, the visible latent image 38, and the digital data image 46. In such situations, it may be preferable that a one-way value obtained from just the main data image 36 alone and a one-way value obtained from combination of the main data image 36 and a copy detection latent image 32 in an invisible and/or not clearly recognized state also be embedded in the image 56.

Modified Example 1

Figure 14:
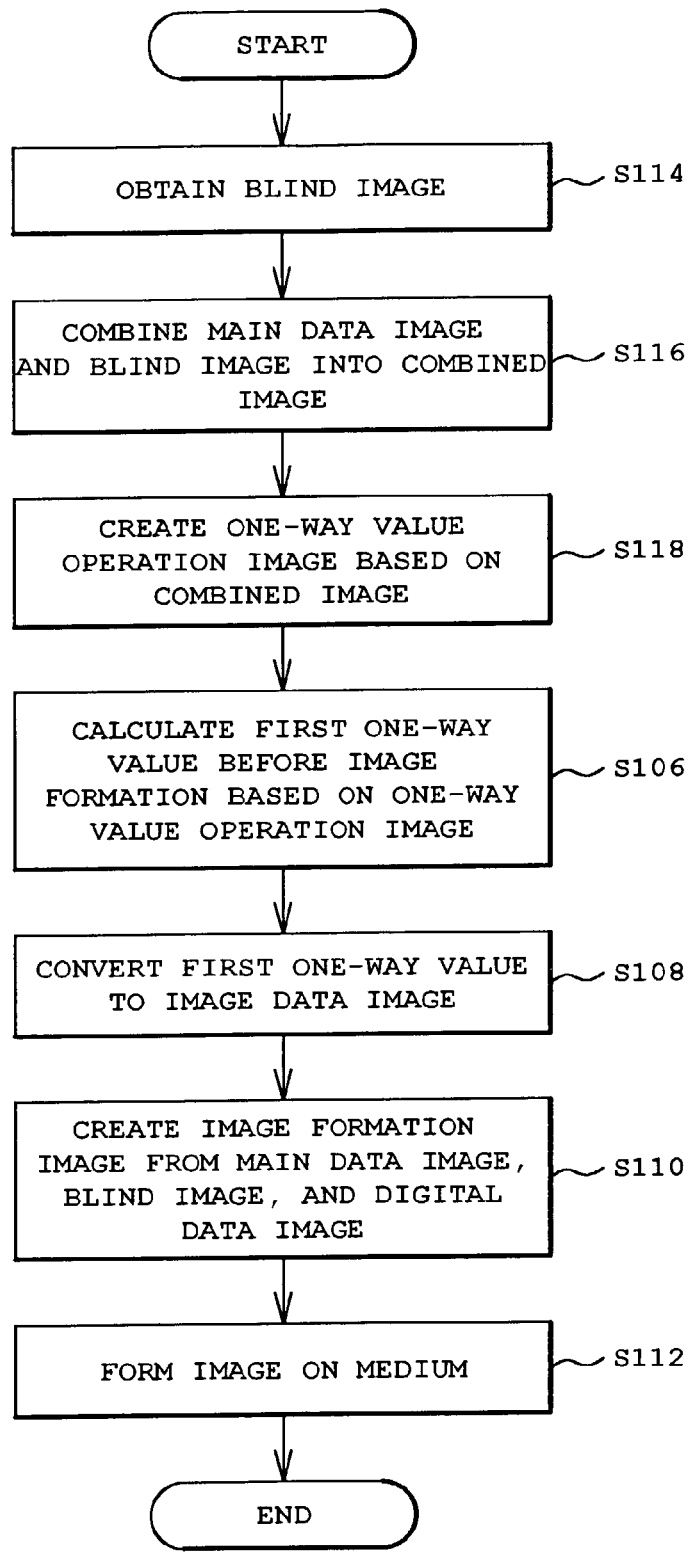
FIG. 14 is a flowchart of a modified image processing method according to the present invention.
Figure 15:
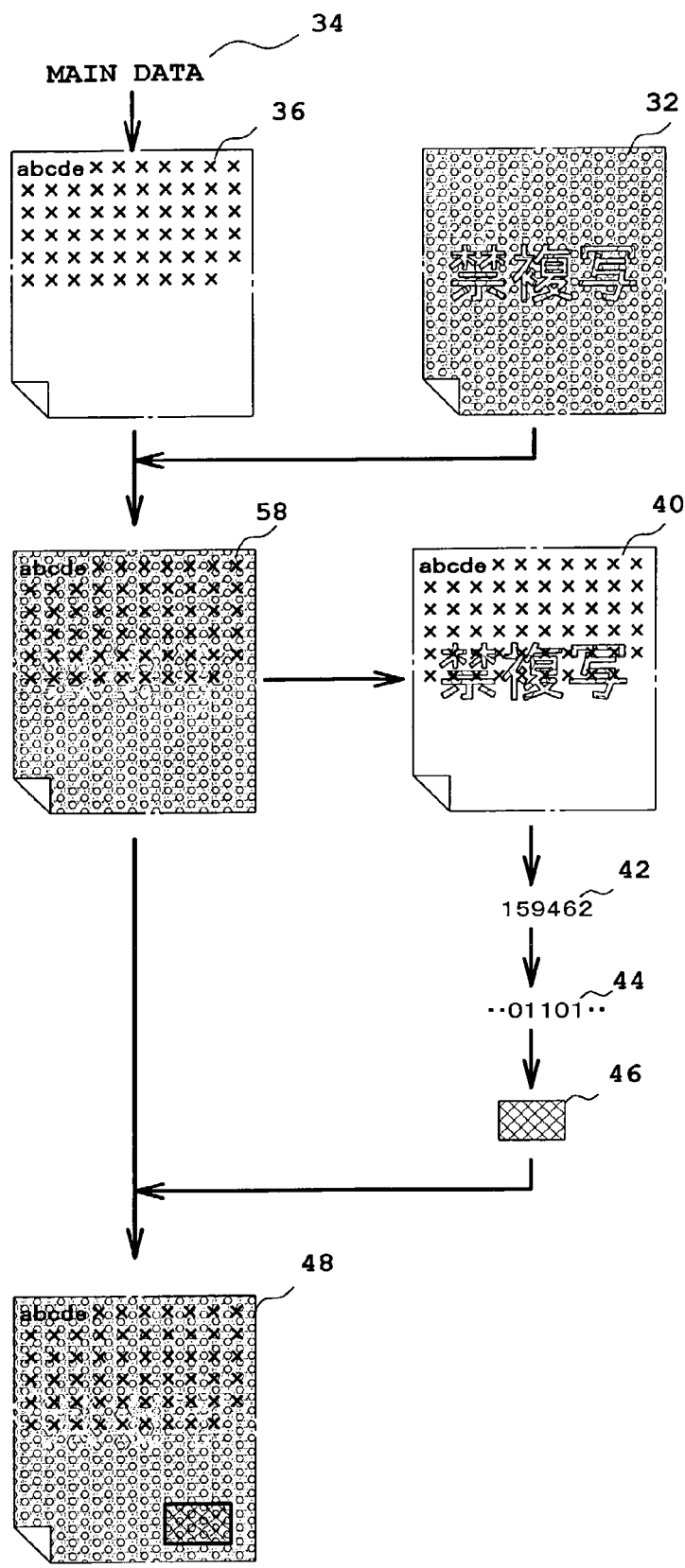
FIG. 15 is a diagram explaining processing in a modified image processing method according to the present invention.

In the following, the first modified example of the above-described image processing method will be described in detail with reference to FIGS. 14 and 15. Process steps at which processing is performed exactly as described above are given identical reference numbers and their description is not repeated.

At step S114, a latent image 32 in an invisible and/or not recognizable state, which is prepared in advance as electronic data, is retrieved from the memory 12. Note that a latent image 32 is prepared in advance and stored in the memory 12 in this modification, as opposed to the above embodiment in which a latent image 32 is created based on job attribute data.

At step S116, the main data image 36 and the latent image 32 are combined to create a combined image 58.

At S118, a one-way value operation image 40 is formed from the combined image 58. A one-way value operation image 40 resembles an image which will be obtained by reading, using an image scanning machine, the combined image 58 when formed on an image formation medium.

At step S106 to S112, similarly to the above-described image processing method, a first one-way value 42 is calculated from the one-way value operation image 40, digital data 44 is obtained from the first one-way value 42, and a digital data image 46 is created based on the obtained digital data 44. Then, the digital data image 46, the main data image 36, and the latent image 32 are combined to thereby create a draft image for image formation on an image formation medium.

As described above, according to the first modified embodiment, the first one-way value 42, which is obtained based on a combination of the main data image 36 and the visible latent image 38 according to the above-described image processing method, is embedded in an image formation medium. This makes it possible to determine whether or not the main data 34 on an image formation medium having a embedded latent image 32 has been altered, and therefore makes undetected manipulation or alteration of the main data 34 on an image formation medium more difficult and less likely.

Although the latent image 32 is prepared in advance in the above example, the latent image 32 may be created based on job attribute data 30, which contains data unique to each image formation, such as, for example, any combination of an identifier of the main data 34, the name of a user performing the procedure, the image processing device used, date of image formation, location information, and so forth. In such a case, a different first one-way value 42 can be obtained with respect to the same main data 34, depending on the situation of image formation. This can enhance reliability of detection as to whether or not data on an image formation medium has been altered.

Further, because the embedded latent image 32 becomes visible on an image formation medium containing a copied image, it is possible to tell a copied version from an original image.

Modified Example 2

In the following, a second modified example of the above-described image processing method will be described in detail with reference to FIGS. 10, 11, 12, and 13. It should be noted that a step at which processing identical to that according to the above-described image processing method is applied is given identical reference numbers and their description is not repeated here.

Figure 10:
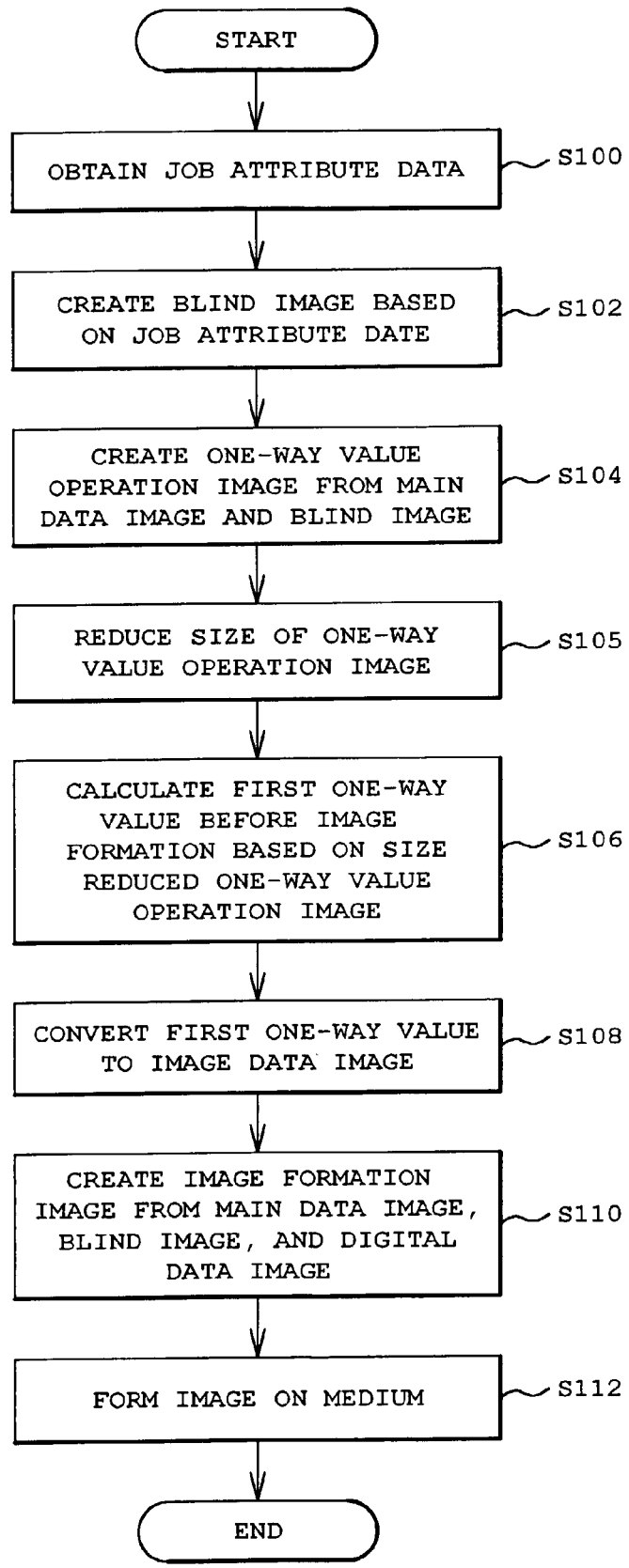
FIG. 10 is a flowchart of a modified image processing method according to the present invention.

Except for addition of a step S105, the image processing method shown in the flowchart of FIG. 10 is identical to the example described immediately above.

Figure 12:
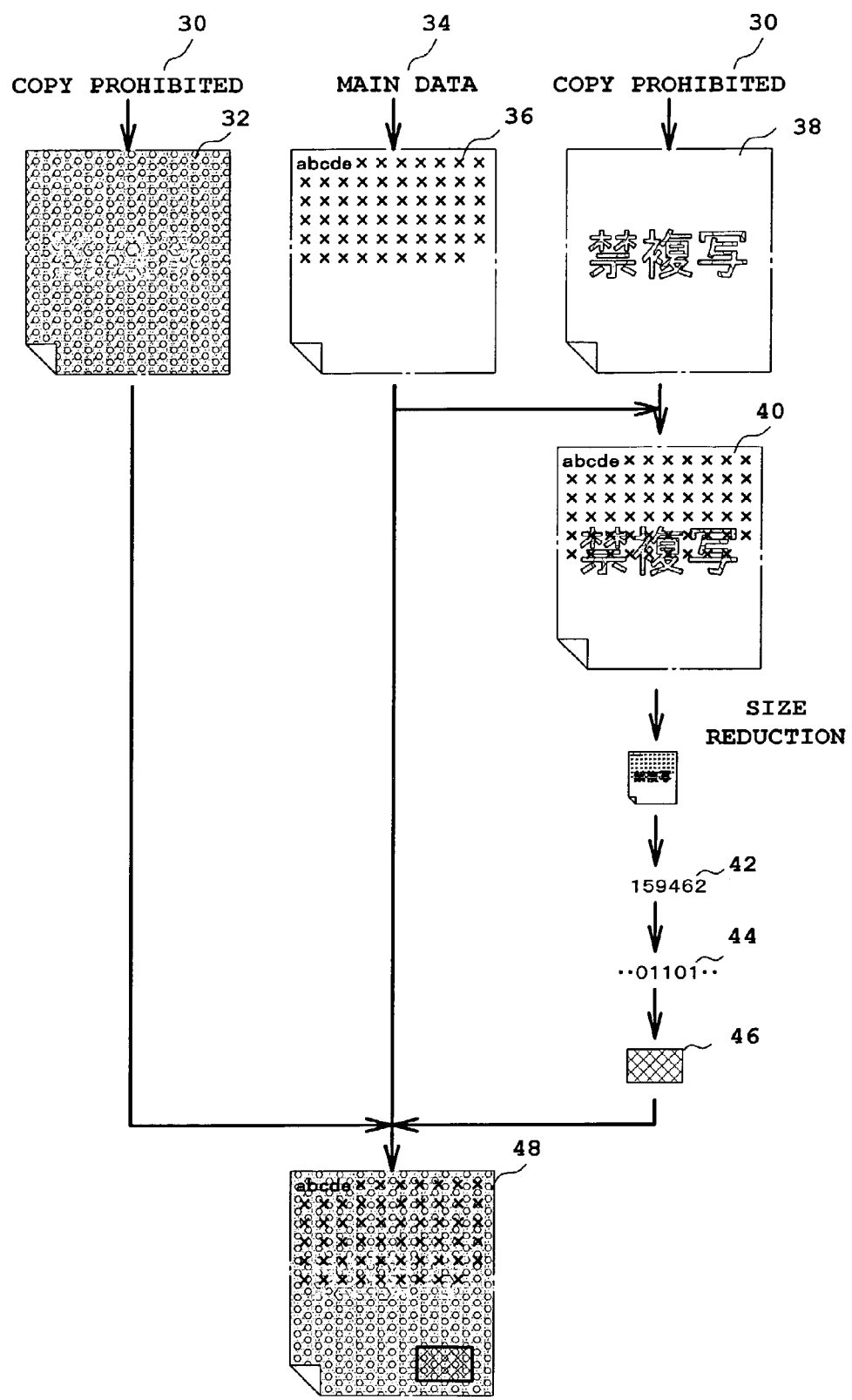
FIG. 12 is a diagram explaining processing according to a modified image processing method according to the present invention.

At step S105, as shown in FIG. 12, the controller 10 reduces the size of a one-way value operation image 40 resulting from combination of the main data image 36 and the visible latent image 38.

At steps S106 and thereafter, a first one-way value 42 is calculated from the reduced one-way value operation image 40 for use in creation of a draft image.

Figure 11:
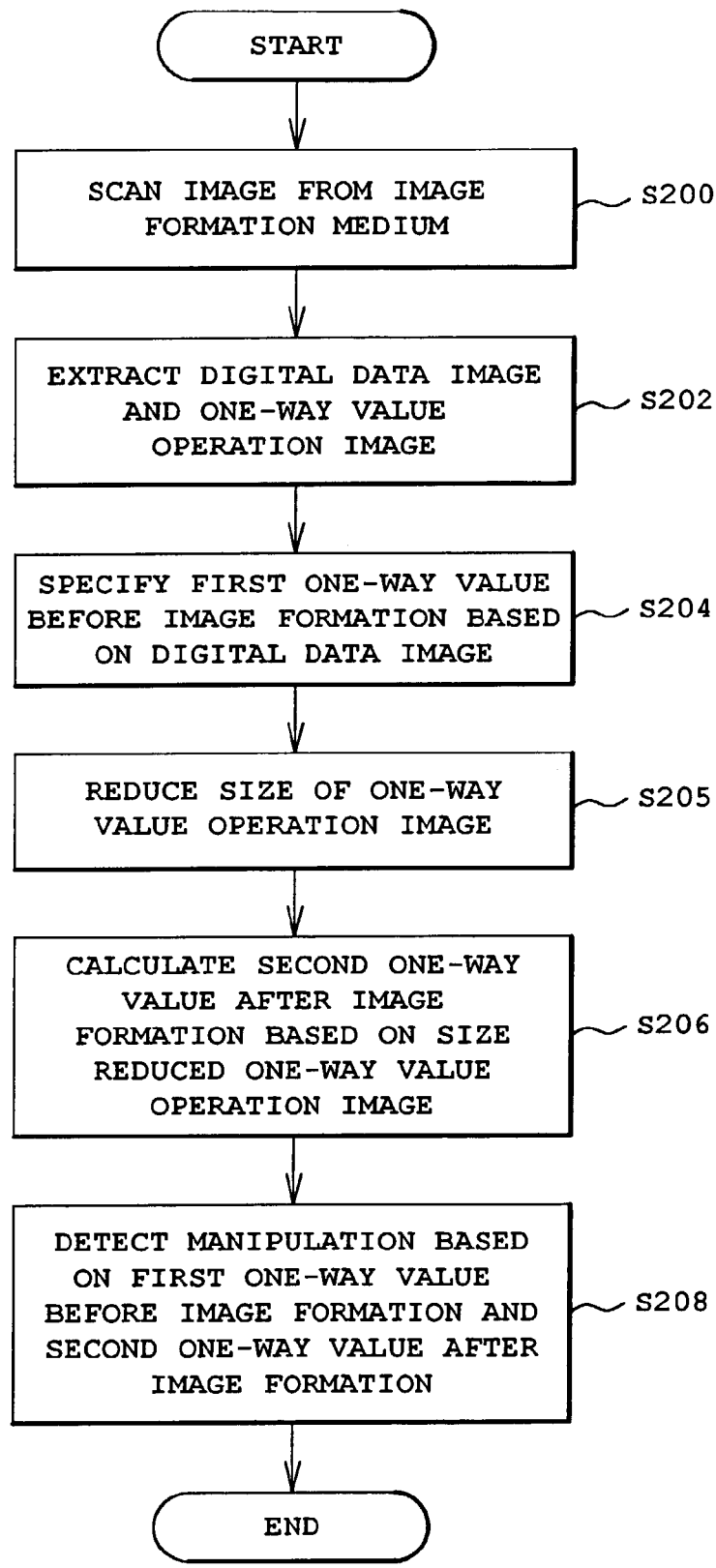
FIG. 11 is a flowchart of a modified manipulation detection method according to the present invention.

An image processing method according to the flowchart of FIG. 11 is identical to the image processing method described above, except for the addition of S205.

Figure 13:
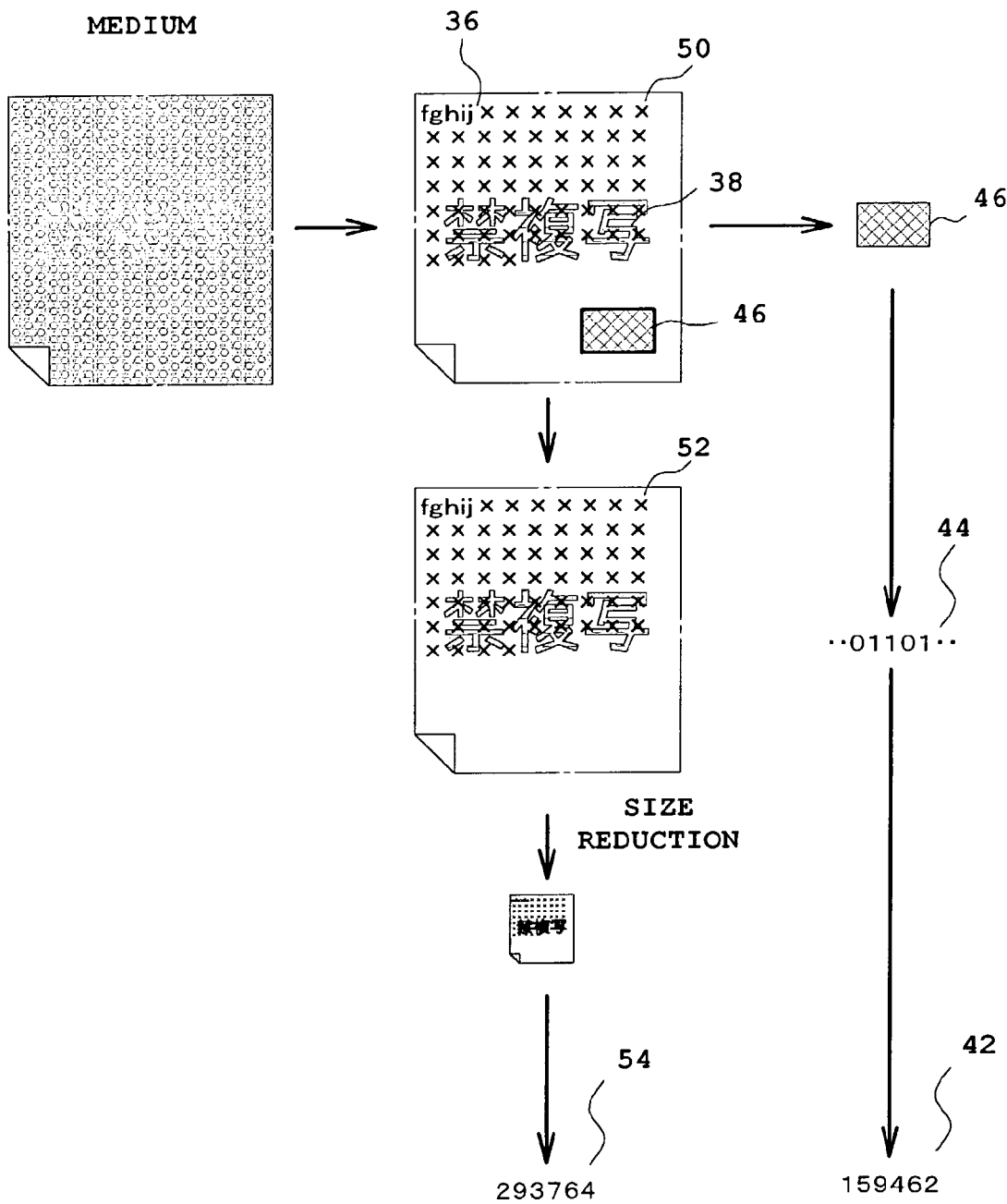
FIG. 13 is a diagram explaining processing according to a modified manipulation detection method according to the present invention.

At S205, as shown in FIG. 13, the controller 10 reduces the size of a one-way value operation image 52 which is scanned from an image formation medium.

At S206 and thereafter, a second one-way value 54 after image formation is calculated from the reduced one-way value operation image 52 for comparison with the first one-way value 42 to detect interpolation and manipulation.

According to this example, the size of the one-way value operation image 40, 52 is reduced before calculation of the first one-way value 42 and the second one-way value 54. With this arrangement, noise, such as dust on an image, can be made less outstanding before execution of one-way value execution, so that reliability of the manipulation detection can be improved. In other words, making an indefinite one-way value operation image 40, 52 before execution of a one-way value operation can enhance reliability of the manipulation detection in spite of presence of noise from outside.

Alternatively, instead of size-reduction, noise removal may be applied to a one-way value operation image 40, 52, to produce an equivalent advantage.

Further alternatively, blurring may be applied instead of size-reduction to a one-way value operation image 40, 52 to produce an equivalent advantage.

According to the present invention, whether or not the main data on an image formation medium on which a copy detection latent image is embedded has been interpolated or manipulated, can be determined.

What is claimed is:

1. An image processing method for detecting alteration of data on an image formation medium on which a main data image and a copy detection latent image which becomes visible or more clearly distinguishable are formed, the method comprising:

a first image creation step of creating an image in a state identical to a state of an image which is obtained by scanning the image formation medium;

a one-way value operation step of effecting a one-way value operation on the image created at the first image creation step to calculate a one-way value;

an image conversion step of converting the one-way value into a visible image representing the one-way value;

a second image creation step of creating an image by superimposing the visible image representing the one-way value, the main data image, and the copy detection latent image.

2. The image processing method according to claim 1, further comprising:

an image processing step of applying at least one of size-reduction, noise removal, and blurring to the image created at the first image creation step, wherein at the one-way value operation step, a one-way value operation is conducted with respect to the image processed at the image processing step.

3. A manipulation detection method for scanning an image formation medium on which an image which is a superimposition of a visible image representing a first one-way value, a main data image, and a copy detection latent image is formed, to detect alteration of data on the image formation medium, the visible image representing a first one-way value being obtained through operation based on an image in a state identical to a state of an image which is obtained by scanning an image formation medium on which the main data image and the copy detection latent image are formed, the method comprising:

an image scanning step of scanning the image formed on an image formation medium;

a one-way value operation step of effecting a one-way value operation on the image excluding the visible image representing the first one-way value from the image scanned at the image scanning step;

a first one-way value specifying step of specifying the first one-way value based on the visible image representing the first one-way value which is scanned at the image scanning step;

a manipulation detection step of detecting alteration of the data on the image formation medium through a comparison of the first one-way value specified at the first one-way value specifying step and a second one-way value calculated at the one-way value operation step.

4. The manipulation detection method according to claim 3, further comprising:

an image processing step of applying at least one of size-reduction, noise removal, and blurring to the image creation at the first image creation step, wherein at the one-way value operation step, a one-way value operation is conducted the image processed at the image processing step.

5. An image processing device for detecting alteration of data on an image formation medium on which a main data image and a copy detection latent image which becomes visible or more clearly distinguishable are formed, the device comprising:

first image creation means for creating an image in a state identical to a state of an image which is obtained by scanning the image formation medium;

one-way value operation means for effecting a one-way value operation on the image created by the first image creation device to calculate a one-way value;

image conversion means for converting the one-way value into an image representing the one-way value;

second image creation means for creating an image by superimposing the visible image representing the one-way value, the main data image, and the copy detection latent image.

6. The image processing device according to claim 5, further comprising:

image processing means for applying at least one of size-reduction, noise removal, and blurring to the image created by the first image creation means, wherein the one-way value operation means effects a one-way value operation with respect to the image processed by the image processing means.

7. A manipulation detection device for scanning an image formation medium on which an image which is a superimposition of a visible image representing a first one-way value, a main data image, and a copy detection latent image is formed, to detect alteration of data on the image formation medium, the visible image representing the first one-way value being obtained through operation based on an image in a state identical to a state of an image which is obtained by scanning an image formation medium on which the main data image and the copy detection latent image are formed, the device comprising:

image scanning means for scanning the image formed on an image formation medium;

one-way value operation means for effecting a one-way value operation on the image excluding the visible image representing the first one-way value from the image scanned by the image scanning means to calculate a second one-way value;

first one-way value specifying means for specifying the first one-way value based on the visible image representing the first one-way value which is scanned by the image scanning means;

manipulation detection means for detecting alteration of the data on the image formation medium by comparison of the first one-way value specified by the first one-way value specifying means and the second one-way value calculated by the one-way value operation means.

8. The manipulation detection device according to claim 7, further comprising:

image processing means for applying at least one of size-reduction, noise removal, and blurring to the image creation by the first image creation means, wherein the one-way value operation means effects a one-way value operation to the image processed by the image processing means.

9. An image processing program for detecting alteration of data on an image formation medium on which a main data image and a copy detection latent image which becomes visible or more clearly distinguishable are formed, the program being capable of being executed on a computer-readable medium, the image processing program performing the following steps:

a first image creation step of creating an image in a state identical to a state of an image which is obtained by scanning the image formation medium;

a one-way value operation step of effecting a one-way value operation on the image created at the first image creation step to calculate a one-way value;

an image conversion step of converting the one-way value into a visible image representing the one-way value;

a second image creation step of creating an image by superimposing the visible image representing the one-way value, the main data image, and the copy detection latent image.

10. A manipulation detection program for scanning an image formation medium on which is formed an image which is a superimposition of a visible image representing a first one-way value, a main data image, and a copy detection latent image, to detect alteration of data on the image formation medium, the visible image representing the first one-way value obtained through operation based on an image in a state identical to a state of an image which is obtained by scanning an image formation medium on which the main data image and the copy detection latent image are formed, the program being capable of being executed on a computer-readable medium, the manipulation detection program performing the following steps:

an image scanning step of scanning the image formed on an image formation medium;

a one-way value operation step of effecting a one-way value operation on the image excluding the visible image representing the first one-way value from the image scanned at the image scanning step;

a first one-way value specifying step of specifying the first one-way value based on the visible image representing the first one-way value which is scanned at the image scanning step;

a manipulation detection step of detecting alteration of the data on the image formation medium by comparison of the first one-way value specified at the first one-way value specifying step and a second one-way value calculated at the one-way value operation step.

11. A device for forming an image, the device comprising:

an image formation medium on which are formed an image which is a superimposition of a visible image representing a first one-way value, a main data image, and a copy detection latent image is formed, in which the visible image representing the first one-way value is obtained through operation based on an image in a state identical to a state of an image which is obtained by scanning an image formation medium on which the main data image and the copy detection latent image.

* * * * *